United States Patent
Takeuchi

(10) Patent No.: US 9,426,371 B2
(45) Date of Patent: Aug. 23, 2016

(54) OPTICAL APPARATUS WITH IMAGE SHAKE CORRECTION AND CONTROL METHOD

(71) Applicant: CANON KABUSHIKI KAISHA, Tokyo (JP)

(72) Inventor: Kenji Takeuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/508,340

(22) Filed: Oct. 7, 2014

(65) Prior Publication Data

US 2015/0103194 A1     Apr. 16, 2015

(30) Foreign Application Priority Data

Oct. 10, 2013  (JP) .................. 2013-212893

(51) Int. Cl.
*H04N 5/232*     (2006.01)

(52) U.S. Cl.
CPC ....... *H04N 5/23287* (2013.01); *H04N 5/23258* (2013.01)

(58) Field of Classification Search
CPC ................ H04N 5/23267; H04N 5/23264; H04N 5/23248; H04N 5/2327; H04N 5/23251
See application file for complete search history.

(56) References Cited

U.S. PATENT DOCUMENTS

| | | | | |
|---|---|---|---|---|
| 5,867,213 A * | 2/1999 | Ouchi | ................ | H04N 5/23248 348/208.2 |
| 5,982,421 A * | 11/1999 | Inou | ................... | H04N 5/23248 348/208.5 |
| 6,630,950 B1 * | 10/2003 | Ohkawara | .......... | H04N 5/23248 348/208.11 |
| 7,904,041 B2 * | 3/2011 | Feher | ................... | H04W 64/00 340/539.25 |
| 7,983,546 B2 * | 7/2011 | Washisu | ............. | G02B 27/646 348/208.99 |
| 8,125,711 B2 * | 2/2012 | Kimura | .................. | G03B 5/00 348/208.11 |
| 8,681,229 B2 * | 3/2014 | Nomura | .................. | G03B 5/00 348/208.1 |
| 2005/0254805 A1 * | 11/2005 | Moriya | ............. | H04N 5/23287 396/53 |
| 2007/0286586 A1 * | 12/2007 | Honma | .................... | G02B 7/36 396/52 |
| 2008/0037970 A1 * | 2/2008 | Saito | ....................... | G03B 5/00 396/55 |
| 2009/0245768 A1 * | 10/2009 | Uenaka | ................. | G03B 17/00 396/53 |
| 2009/0251551 A1 * | 10/2009 | Uenaka | .................... | G03B 5/00 348/208.4 |
| 2009/0316010 A1 * | 12/2009 | Nomura | .................. | G03B 5/00 348/208.6 |
| 2010/0123787 A1 * | 5/2010 | Yamanaka | .......... | G02B 27/646 348/208.4 |
| 2011/0013896 A1 * | 1/2011 | Kawahara | ............... | G03B 5/00 396/55 |
| 2013/0034345 A1 * | 2/2013 | Miyahara | .......... | H04N 5/23258 396/55 |

FOREIGN PATENT DOCUMENTS

JP      2009-258389 A     11/2009

* cited by examiner

*Primary Examiner* — Amy Hsu

(74) *Attorney, Agent, or Firm* — Cowan, Liebowitz & Latman, P.C.

(57) ABSTRACT

An image pickup apparatus includes a shake detecting unit configured to detect a shake of the image pickup apparatus; and a first optical correcting unit and a second optical correcting unit configured to correct optically an image shake by using a shake signal output from the shake detecting unit, wherein the first optical correcting unit is used to correct optically the image shake based on frequency components lower than predetermined frequency components extracted from the shake signal, and wherein the second optical correcting unit is used to correct optically the image shake based on frequency components higher than the predetermined frequency components extracted from the shake signal.

10 Claims, 8 Drawing Sheets

FIG. 7

| | First correcting unit | Second correcting unit |
|---|---|---|
| Anti-shake frequency band | Low-frequency | High-frequency |
| Correction angle of the anti-shake | Wide | Narrow |
| Deterioration in optical performance by the lens driving | Less | Large |
| Drive mode | Tilting | Shifting |
| The arrangement position of the lens | The side of the object image | The side of the imaging element |
| Amplification factor of the Position detection signal | Small | Big |
| Anti-shake adjustment frequency | Low-frequency | High-frequency |
| Frequency band of the return control unit | Narrow | Wide |
| Anti-shake angle to the lens drive stroke | Big | Small |

OPTICAL APPARATUS WITH IMAGE SHAKE CORRECTION AND CONTROL METHOD

BACKGROUND OF THE INVENTION

1. Field of the Invention

The present invention relates to an image pickup apparatus and a control method therefor.

2. Description of the Related Art

A shake (image shake) of an object image can be caused by the shaking of a user's hand which holds a camera main body (causing a hand shaking) when capturing an image by an image pickup apparatus such as a digital camera. There has been proposed an image pickup apparatus comprising an image shake correcting unit for correcting the image shake.

Optical image shake correction processing and electronic image shake correction processing have been used as conventional correction processing by the image shake correcting unit. The optical image shake correction processing detects vibration applied to a camera main body with an angular velocity sensor or the like. An anti-shake lens provided in an imaging optical system is moved depending on the result of the detection. Thereby, the image focused in a light-receiving plane of an imaging element is moved to correct the image shake by altering the direction of an optical axis in the imaging optical system. Also, the electronic image shake correction processing is a processing for artificially correcting the image shake by performing an image processing on a captured image.

The performance of the image shake correction according to the conventional image shake correcting unit is likely to affect some difference, for example, the difference depending on a photographing status, characteristics of a photographer's hand shaking, or the like. The difference depending on the characteristics of the photographer's hand shaking may be a difference of frequency band due to the specific photographer's large hand shaking. Also, the difference depending on the photographing status is considered to be a status, for example, when photographing while riding and when photographing while walking or the like. Such a status, a shake amount capable of correcting the image shake by an image shake correcting unit is required to be larger because an image shake amount is large. However, the size of the image shake correcting unit may be increased to increase the image shake correction amount.

Japanese Patent Laid-Open No. 2009-258389 discloses an image shake correcting device comprising a first movable barrel for holding a first correction member and a second movable barrel for holding a second correction member, and a fixing member between the first movable barrel and the second movable barrel.

Japanese Patent Laid-Open No. 2009-258389 discloses an image shake correcting device for driving the first correction member and the second correction member inversely to obtain a large correction angle with few drive stroke. However, the performance of the image shake correction is reduced depending on the differences between the characteristics of the photographer's hand shaking, the photographing status or the like when the correction angle is only expanded, such as the image shake correcting device.

SUMMARY OF THE INVENTION

The present invention provides an image pickup apparatus for preventing reduction in performance of image shake correction due to differences depending on characteristics of a photographer's hand shaking or a photographing status.

According to an embodiment of the present invention, an image pickup apparatus comprises a shake detecting unit configured to detect a shake of the image pickup apparatus; and a first optical correcting unit and a second optical correcting unit configured to correct optically an image shake by using a shake signal output from the shake detecting unit, wherein the first optical correcting unit is used to correct optically the image shake based on frequency components lower than predetermined frequency components extracted from the shake signal, and wherein the second optical correcting unit is used to correct optically the image shake based on frequency components higher than the predetermined frequency components extracted from the shake signal.

Further features of the present invention will become apparent from the following description of exemplary embodiments (with reference to the attached drawings).

BRIEF DESCRIPTION OF THE DRAWINGS

FIG. 7 illustrates a drive condition for a first correcting unit and a second correcting unit.

DESCRIPTION OF THE EMBODIMENTS

Figure 1:
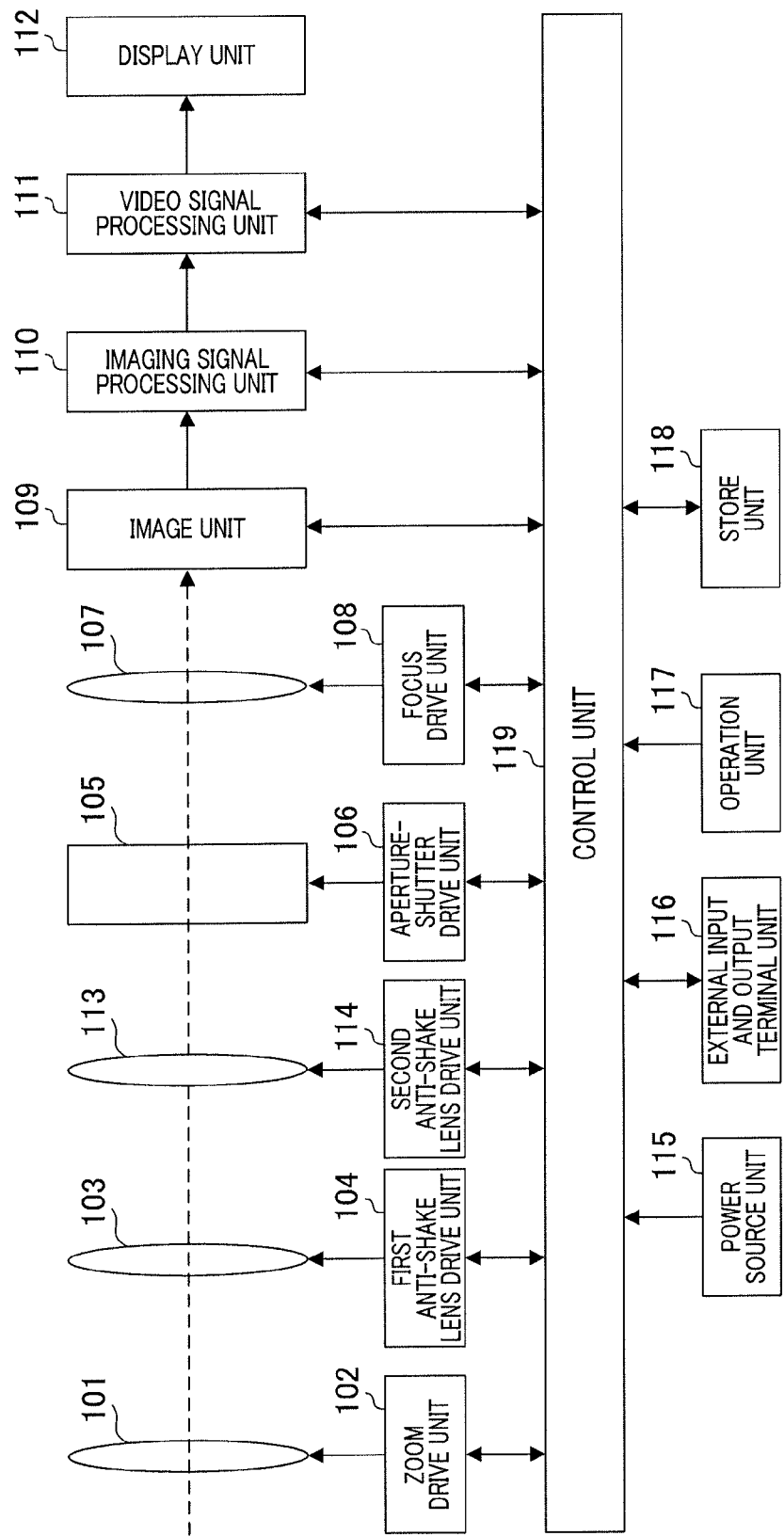
FIG. 1 illustrates an exemplary configuration of an image pickup apparatus according to an embodiment of the present invention.

FIG. 1 illustrates an exemplary configuration of an image pickup apparatus according to an embodiment of the present invention. The image pickup apparatus as shown in FIG. 1 is a digital still camera. Also, the image pickup apparatus according to the present embodiment may have a function of moving image photographing.

The image pickup apparatus as shown in FIG. 1 comprises from a zoom unit 101 to a control unit 119. The zoom unit 101 is a portion of a photographing lens with variable magnification that constitutes an image forming optical system. The zoom unit 101 comprises a zoom lens for altering the magnification of the photographing lens. A zoom drive unit 102 controls a drive of the zoom unit 101 according to the control of the control unit 119. A first anti-shake lens 103 is a correction member for correcting image shake. The first anti-shake lens 103 is configured to be movable in a direction perpendicular to an optical axis of the photographing lens. A first anti-shake lens drive unit 104 controls the drive of the first anti-shake lens 103. A second anti-shake lens 113 has the same configuration as the first anti-shake lens. The second anti-shake drive unit 114 also controls the drive of the second anti-shake lens 113.

An aperture-shutter unit 105 is a mechanical shutter with an aperture function. An aperture-shutter drive unit 106 drives the aperture-shutter unit 105 according to a control of a control unit 119. A focus lens 107 is a portion of the photographing lens and is configured to enable altering the position of the focus lens 107 according to the optical axis of the photographing lens. A focus drive unit 108 drives the focus lens 107 according to the control of the control unit 119.

An image unit 109 converts an optical image by the photographing lens into an electric signal in pixel units by using an imaging element such as a CCD image sensor and a CMOS image sensor. The CCD stands for a Charge Coupled Device. The CMOS stands for a Complementary Metal-Oxide. An imaging signal processing unit 110 performs AD conversion, correlating double sampling, γ correction, white balance correction, color interpolation processing and the like to convert an optical image output from the image unit 109 into a video signal. A video signal processing unit 111 processes the video signal output from the imaging signal processing unit 110 depending on the use. More specifically, the video signal processing unit 111 generates a video for display and performs an encoding process and a data filing for record or the like.

A display unit 112 displays the image as necessary based on the video signal for display which the video signal processing unit 111 outputs. A power source unit 115 supplies the power source to the whole image pickup apparatus depending on the use. An external input and output terminal unit 116 inputs and outputs a communication signal and the video signal between the external input and output terminal unit 116 and an external device. An operation unit 117 comprises a button, a switch or the like to provide an instruction to the image pickup apparatus by the user. A store unit 118 stores a variety of data such as video information. For example, the control unit 119 comprising for example, a CPU, a ROM, and a RAM, develops the control program stored in the ROM to the RAM to carry out the instruction in the CPU to control each unit of the image pickup apparatus and obtain operation of the image pickup apparatus including a variety of operations described as below. The CPU stands for a Central Processing Unit. The ROM stands for a Read Only Memory. The RAM stands for a Random Access Memory.

The operation unit 117 comprises a release button configured to turn "ON" a first switch (SW1) and a second switch (SW2) in turn depending on a pressing amount. The release switch SW1 turns "ON" when the release button is half-pressed, and the release switch sw2 turns "ON" when the release button is fully-pressed. When the release switch SW1 turns "ON", the control unit 119 calculates an AE evaluation value based on the video signal for display which the video signal processing unit 111 outputs to the display unit 112. Then, the control unit 119 controls the focus drive unit 108 based on the AE evaluation value to detect the focus automatically.

In addition, the control unit 119 performs AE processing to determine an aperture value and a shutter speed to obtain an appropriate exposure amount based on the information about brightness of the video signal and a predetermined program diagram. When the release switch SW2 is turned "ON", the control unit 119 performs photographing at the determined aperture and the shutter speed, and controls each of the processing units to store the image data obtained from the image unit 109 to the store unit 118.

The operation unit 117 further comprises an anti-shake switch capable of selecting a shake correction (anti-shake) mode. When the shake correction mode is selected by the anti-shake switch, the control unit 119 instructs the first anti-shake lens drive unit 104 and the second anti-shake drive unit 114 to perform an anti-shake operation. The instructed anti-shake lens drive unit 104 and the anti-shake drive unit 114 perform the anti-shake operation until the instruction of "anti-shake OFF" is issued. Also, the operation unit 117 comprises a photographing-mode select switch capable of selecting either a still image photographing mode or a moving image shooting mode. The control unit 119 can alter the operation condition of the first anti-shake lens drive unit 104 and the second anti-shake drive unit 114 according to the selection of the photographing mode by the operation of the photographing-mode select switch. The image shake correcting device according to the present embodiment is composed of the first anti-shake lens drive unit 104 and the second anti-shake drive unit 114.

Also, the operation unit 117 comprises a play-mode select switch for selecting a play-mode. When the play-mode is selected by operating the play-mode select switch, the control unit 119 stops the anti-shake operation. In addition, the operation unit 117 comprises a magnification change switch for performing the instruction for the change of the zoom magnification. When the instruction for the change of the zoom magnification is performed by operating the magnification change switch, the zoom drive unit 102 that has received the instruction via the control unit 119 drives the zoom unit 101 to move the zoom unit 101 to the instructed zoom position.

Figure 2:
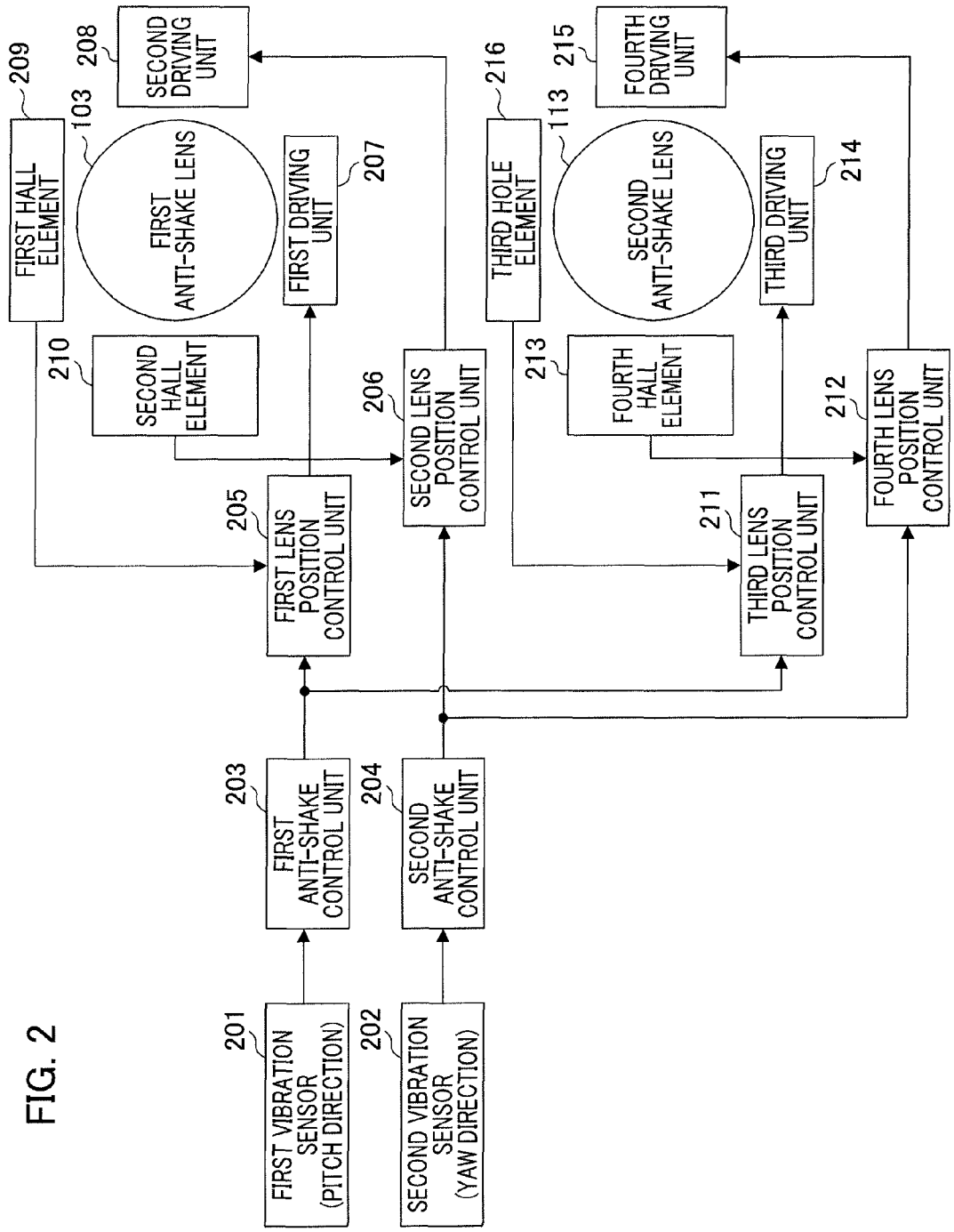
FIG. 2 illustrates a configuration of an image shake correcting device according to an embodiment of the present invention.

FIG. 2 illustrates a configuration of the image shake correcting device according to an embodiment of the present invention.

A first vibration sensor 201 is, for example, an angular velocity sensor, and detects vibration in a direction perpendicular to the image pickup apparatus (pitch direction) in a natural attitude (an attitude whose direction of the image closely matches to the horizontal direction). The second vibration sensor 202 is for example, an angular velocity sensor, and detects vibration in a direction parallel to the image pickup apparatus in the natural attitude (yaw direction). A first anti-shake control unit 203 outputs a correction position control signal of the anti-shake lens in the pitch direction to control a drive of the anti-shake lens. A second anti-shake control unit 204 outputs the correction position control signal of the anti-shake lens in the yaw direction to control the drive of the anti-shake lens.

A first lens position control unit 205 performs feedback control from the correction position control signal from the first anti-shake control unit 203 in the pitch direction and the position information of the anti-shake lens from a first hall element 209 in the pitch direction. Thereby, the first lens control unit 205 drives, for example, a first driving unit 207 that is an actuator. Also, a second lens control unit 206 performs the feedback control based on the correction position control signal from the second anti-shake control unit 204 in the yaw direction and the position information of the anti-shake lens from a second hall element 210 in the yaw direction. Thereby, the second lens control unit 206 drives, for example, a second driving unit 208 that is the actuator.

Next, a description will be given of drive control operation of the first anti-shake lens 103 by the first anti-shake lens drive unit 104.

A shake signal (angular velocity signal) representing a shake in the pitch direction of the image pickup apparatus is supplied from the first anti-shake control unit 203 and the first vibration sensor 201. Also, The shake signal (angular velocity signal) representing the shake in the yaw direction is supplied from the second vibration sensor 202 to the second anti-shake control unit 204.

The first anti-shake control unit 203 generates the correction position control signal for driving the anti-shake lens 103 in the pitch direction based on the supplied shake signal to output the correction position control signal to the first lens position control unit 205. Also, the second anti-shake control unit 204 generates the correction position control signal for driving the anti-shake shake lens 103 in the yaw direction to output the correction position control signal to the second lens position control unit 206.

The first hall element 209 outputs the signal having voltage depending on magnetic field strength by a magnet disposed in the first anti-shake lens 103 as the position information of the first anti-shake lens 103 in the pitch direction. The second hall element 210 outputs the signal having voltage based on magnetic field strength by the magnet disposed in the first anti-shake lens 103 as the position information of the first anti-shake lens 103 in the yaw direction. The position information is supplied to the first lens control unit 205 and the second lens control unit 206.

The first lens control unit 205 controls the feedback while driving the first driving unit 207 so that the signal value from the first hall element 209 converges to the correction position control signal value from the first anti-shake control unit 203. Also, the second lens control unit 206 controls the feedback while driving the second driving unit 208 so that the signal value from the second Hall element 210 converges to the correction position control signal value from the second anti-shake control unit 204.

Note that the output of the first hall element 209 and the second hall element 210 is adjusted so that the anti-shake lens 103 is moved to the predetermined position with respect to the predetermined correction position control signal because the position signal value output from the first hall element 209 and the second hall element 210 are variable.

The first anti-shake control unit 203 outputs the correction position control signal for moving the position of the first anti-shake lens 103 to cancel the image shake of the object image based on the shake information from the first vibration sensor 201. The second anti-shake control unit 204 outputs the correction position control signal for moving the position of the first anti-shake lens 103 to cancel the image shake based on the shake information from the second vibration sensor 202.

The second anti-shake control unit 204 outputs the correction position control signal for moving the position of the first anti-shake lens 103 to cancel the image shake based on the shake information from the second vibration sensor 202. For example, the first anti-shake control unit 203 and the second anti-shake control unit 204 generate a correction speed control signal or the correction position control signal by performing filter processing or the like on the shake information (angle velocity signal) or the shake information. By the above operation, if there is vibration such as a hand shaking at the image pickup apparatus, the image shake can be prevented to a certain level of vibration. Also, the first anti-shake control unit 203 and the second anti-shake control unit 204 detect a panning state of the image pickup apparatus based on the shake information from the first vibration sensor 201 and the second vibration sensor 202, and the output of the first hall element 209 and the second hall element 210 to perform a panning control.

The drive control operation of the second anti-shake lens 113 by the second anti-shake drive unit 204 is similar to that of the first anti-shake lens 103 by the first anti-shake lens drive unit 104. In other words, the first anti-shake control unit 204 generates the correction position control signal for driving the second anti-shake lens 113 in the pitch direction based on the supplied shake signal to output the correction control signal to a third lens position control unit 211. Also, the second anti-shake control unit 204 generates the correction position control signal for driving the anti-shake lens 113 in yaw direction based on the supplied shake signal to output the correction position control signal to a fourth lens position control unit 212.

The third lens position control unit 211 controls a feedback while driving a third driving unit 214 so that a signal value from a third Hall element 216 converges to the correction position control signal value from the first anti-shake control unit 203. Also, the fourth lens position control unit 212 controls a feedback while driving a fourth driving unit 215 so that the signal value from a fourth Hall element 213 converges to the correction position control signal value from the second anti-shake control unit 204.

In the present embodiment, the first anti-shake control unit 203, the first lens position control unit 205, and the first driving unit 207 correct the low-frequency components of the shake signal in the pitch direction. Also, the first anti-shake control unit 203, the third lens position control unit 211, and the third driving unit 214 correct the high-frequency components of the shake signal in the pitch direction.

Also, the second anti-shake control unit 204, the second lens position control unit 206 and the second driving unit 208 correct the low-frequency components of the shake signal in the yaw direction. Also, the second anti-shake control unit 204, the fourth lens position control unit 212 and the fourth driving unit 215 correct the high-frequency components of the shake signal in the yaw direction.

Figure 3:
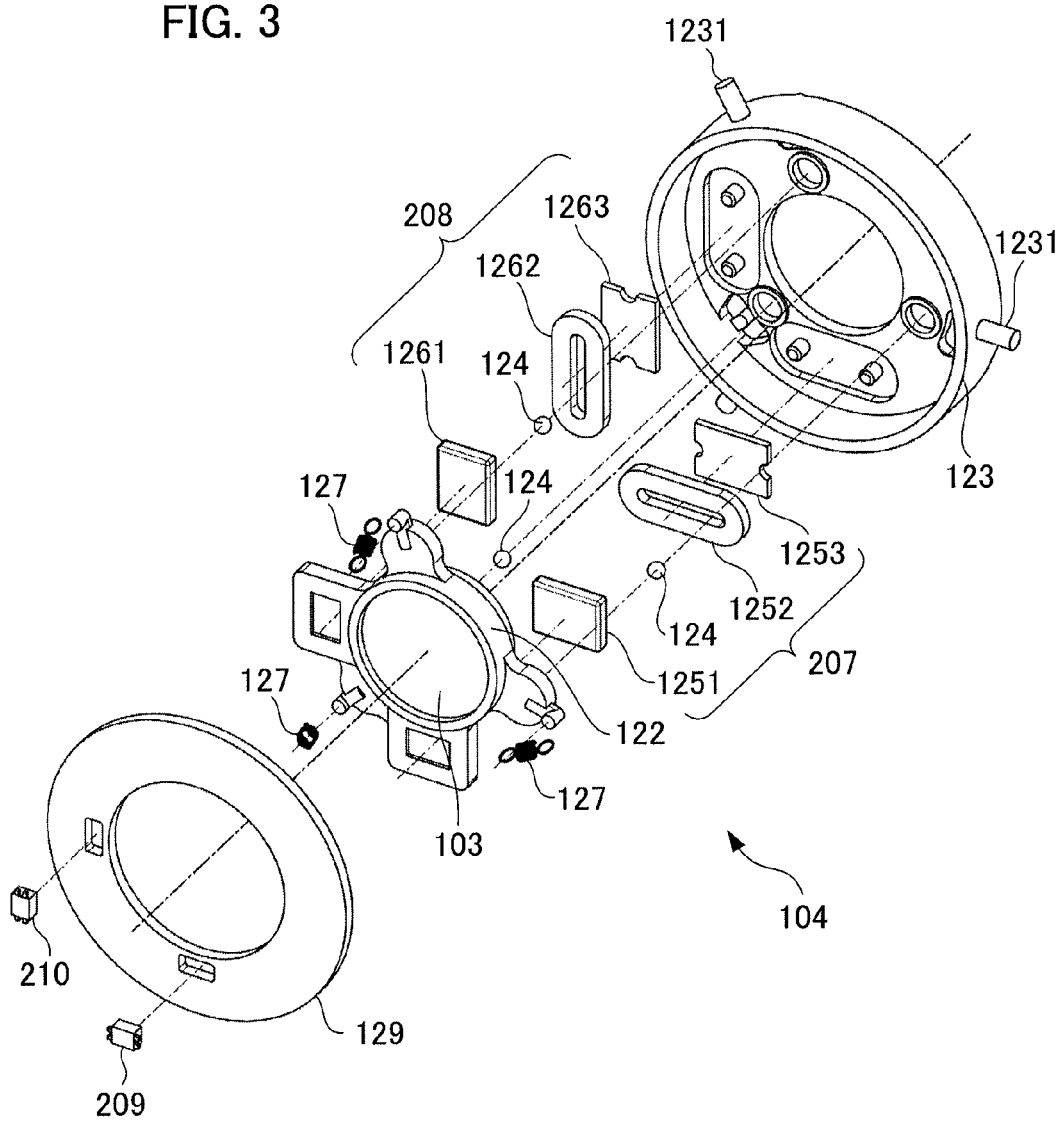
FIG. 3 is an example of a perspective view of a first anti-shake drive unit.

FIG. 3 is an example of a perspective view of a first anti-shake lens drive unit. The first anti-shake lens drive unit 104 comprises the first anti-shake lens 103, a movable barrel 122, a fixed base plate 123, a rolling ball 124, a first electromagnetic drive unit 207, and a second electromagnetic drive unit 208. The first anti-shake lens drive unit 104 comprises an urging spring 127, a first position sensor 209, a second position sensor 210, and a sensor holder 129.

The first electromagnetic drive unit 207 comprises a first magnet 1251, a first coil 1252, and a first yoke 1253. The second electromagnetic drive unit 208 comprises a second magnet 1261, a second coil 1262, and a second yoke 1263.

The first anti-shake lens 103 is a first correcting optical member capable of offsetting an optical axis. The first anti-shake lens 103 is drive controlled by the first anti-shake control unit 203 and the second anti-shake control unit 204. Thereby, image shake correction operation for moving an optical image for passing through the image optical system is performed to ensure stability of the image on an imaging plane. Note that while a correction lens is used as a correction optical system according to an embodiment of the present invention, an imaging unit such as the CCD to a photographing optical system may be driven to ensure stability of the image on the imaging plane. In other words, the imaging unit may be used as a unit for correcting the image shake.

The movable barrel 122 is a first movable portion for holding the first anti-shake lens 103 at the central opening. The movable barrel 122 holds the first magnet 1251 and the second magnet 1252. Also, the movable barrel 122 comprises three rolling ball receivers and is supported so as to be capable moving in the plane perpendicular to the optical axis by the rolling ball 124. Also, the movable barrel 122 comprises three spring hooks, which are capable of holding one end of the urging spring 127.

The fixed base plate 123 is a first fixing member formed into a cylinder shape. The fixed base plate 123 comprises three followers 1231 on the outer circumference unit. The movable barrel 122 is arranged at the central opening of the fixed base plate 123. Thereby, the movable amount of the movable barrel 122 can be limited.

Also, the fixed base plate 123 holds the first coil 1252 and the first yoke 1253 at the point where the fixed base plate 123 faces the magnetized surface of the first magnet 1251. Also, the fixed base plate 123 holds the second coil 1262 and the second yoke 1263 at the point where the fixed base plate 123 faces the magnetized surface of the second magnet 1261. Also, the fixed base plate 123 comprises three rolling ball receivers and holds the movable barrel 122 in the plane perpendicular to the optical axis through the rolling ball 124. In addition, the fixed base plate 123 comprises three spring hooks, which hold one end of the urging spring 127.

In this example, the first electromagnetic drive unit 207 is the well-known voice coil motor. An electric current is passed through the first coil 1252 attached to the fixed base plate 123 to generate the Lorentz force between the first magnet 1251 fixed to the movable barrel 122 and the fixed base plate 123 to drive the movable barrel 122. The second driving unit 208 is arranged similar to the voice coil motor of the first electromagnetic drive unit 207 rotated by 90 degrees and thus, a detailed description thereof will be omitted.

The urging spring 127 is a tensile spring that generates an urging force proportional to the deformed amount. One end of the urging spring 127 is fixed to the movable barrel 122 and the other of that is fixed to the fixed base plate 123 to generate the urging force therebetween. The rolling ball 124 is held by this urging force to keep the contact state with the fixed base plate 123 and the movable barrel 122.

The first position sensor 209 and the position sensor 210 are two magnetic sensors with the hall element that reads the magnetic flux of the first magnet 1251 and the second magnet 1261. The movement in the plane of the movable barrel 122 can be detected from the change of the output.

The sensor holder 129 is configured on the substantial disk and fixed to the fixed base plate 123. The two position sensors (209,210) can be held at the position where the position sensors face the first magnet 1251 and the second magnet 1261. Also, the sensor holder 129 can house the movable barrel 122 inside the space formed together with the fixed base plate 123. Thereby the inside units can be prevented from falling away even when an impact force is applied to the image shake correcting device or the difference of the attitude is varied. The first anti-shake lens drive unit 104 can allow the first anti-shake lens 103 to move to any position in the plane perpendicular to the optical axis according to the configuration described above.

Figure 4:
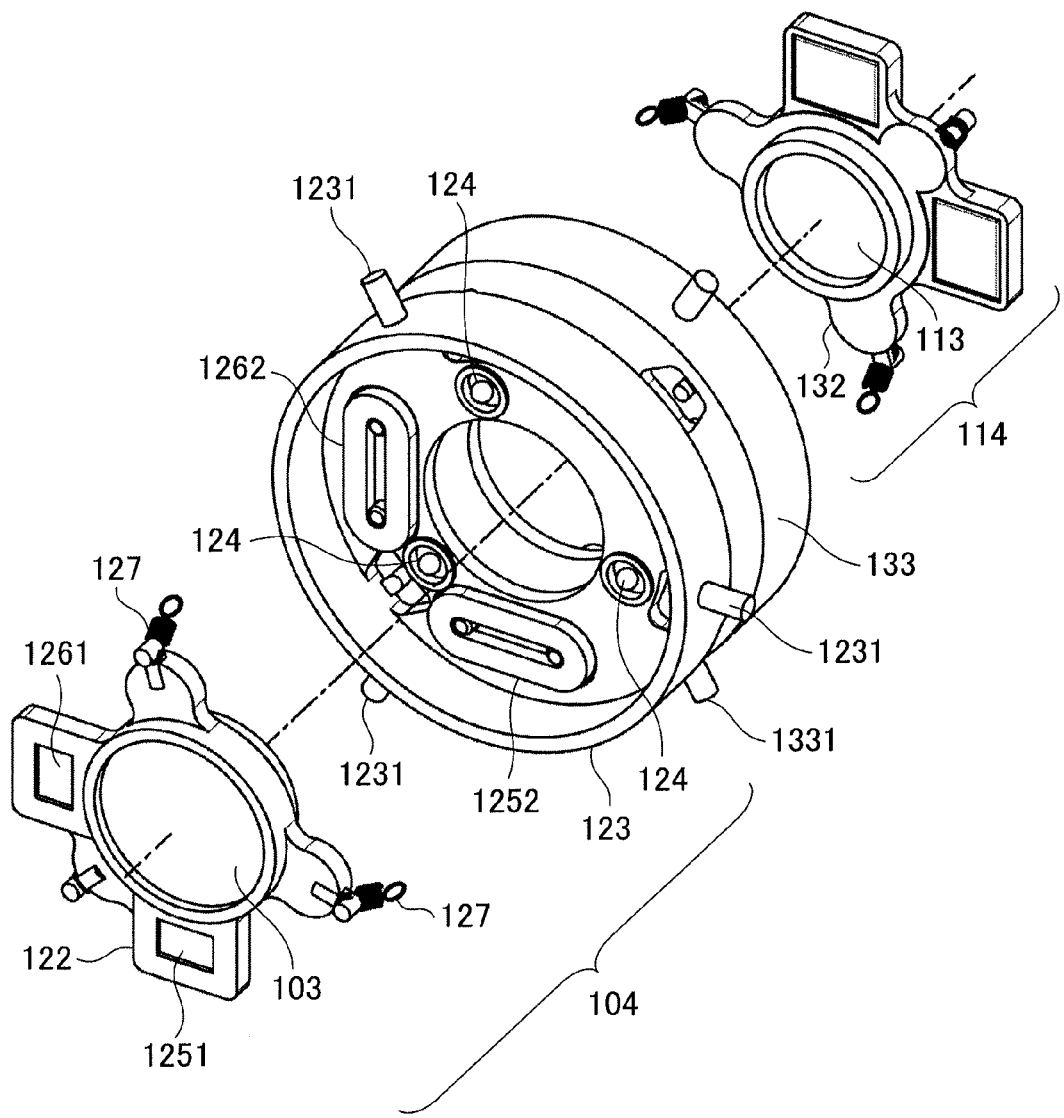
FIG. 4 illustrates a positional relationship of a first anti-shake lens drive unit and a second anti-shake lens drive unit.

FIG. 4 illustrates a positional relationship of the first anti-shake lens drive unit and the second anti-shake lens drive unit. A part of the anti-shake lens drive units is exploded or omitted for the sake of explanation. The movable barrel 132 is a second movable unit in the second anti-shake drive unit 114. The movable barrel 132 holds the second anti-shake lens 113 at the central opening. A fixed base plate 133 is a second fixing member in the second anti-shake drive unit 114. The second anti-shake lens drive unit 114 has a configuration similar to that of the first anti-shake lens drive unit, except for the shape of the lens and the movable barrel 132 holding the lens, and thus, a detailed description thereof will be omitted.

Figure 5:
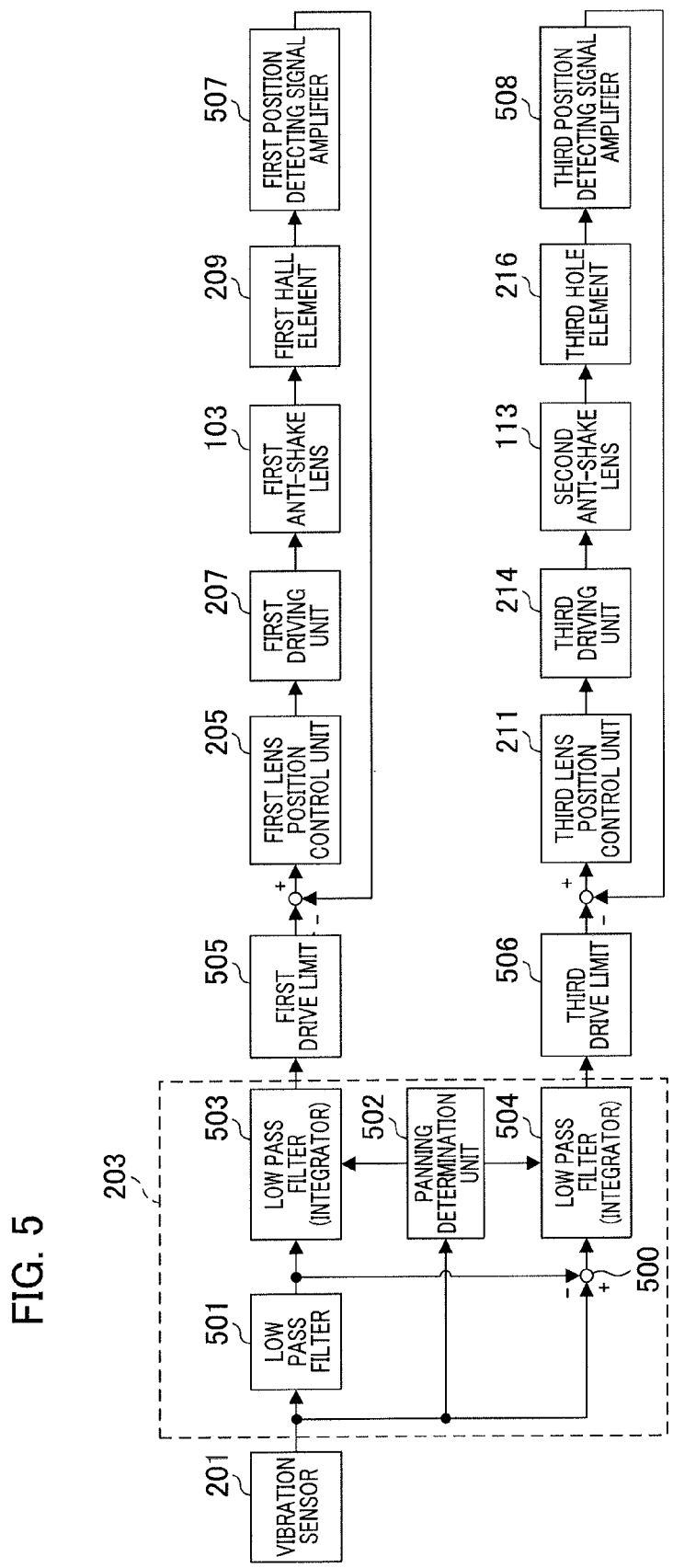
FIG. 5 illustrates a mechanism for correcting a shake signal.

According to an embodiment of the present invention, FIG. 5 illustrates a mechanism for correcting a shake signal in pitch direction in the image shake correcting device. A mechanism for correcting the shake signal in the yaw direction is realized by the second anti-shake control unit 204, the second lens position control unit 206, the fourth lens position control unit 212, the second drive unit 208, and the fourth driving unit 215 being similar to that shown in FIG. 5, and thus, a description thereof will be omitted.

In FIG. 5, the first vibration sensor 201 detects a shake information signal (angle velocity signal) applied to the image pickup apparatus. The first anti-shake control unit 203 comprises LPFs (low pass filters) 501, 503, 504, a panning determination unit 502, and a subtracter 500. The LPF 501 extracts the low-frequency components from the detected shake signal by the first vibration sensor 201. The low-frequency hand shaking signal extracted by the LPF 501 is integrated by the LPF 503 with which a time constant until the Filter becomes stable is variable to generate a shake angle signal extracted only the low-frequency components. The term "A time constant until the Filter becomes stable is variable" means for example, that the coefficient of the filter is varied to allow cut-off frequency to be variable, or that the buffer for holding the result of the calculation (median) in the filter calculation can be rewritten freely at any timing.

The panning determination unit 502 determines the panning operation of the image pickup apparatus to perform time constant change processing until the filters of the LPF 503 and the LPF 504 become stable. More specifically, the panning determination unit 502 determines that the panning operation has been done, if the shake signal detected by the first vibration sensor 201 is over a predetermined value. The panning determination unit 502 may determine that the panning operation is done if the current positions of the first anti-shake lens 103 and the second anti-shake lens 113 are over the predetermined value. Also, the panning determination unit 502 may determine that the panning operation is done if the target positions of the first anti-shake lens 103 and the second anti-shake lens 113 are over the predetermined value. Thereby, the first anti-shake lens 103 and the second anti-shake lens 113 can be prevented from driving above the movable range and the photographing image can be prevented from being unstable due to a swing-back immediately after the panning operation if a large shake is applied to the image pickup apparatus.

The subtracter 500 extracts the high-frequency components from the hand shaking signal by subtracting the extracted low-frequency components in the LPF 501 from the detected hand shaking signal in the first vibration sensor 201. The LPF 504 integrates the extracted high-frequency components to transform them from the angle velocity information to the angle information to generate the hand shaking angle signal extracted only the high-frequency components. Note that the coefficient of the LPF 503 and the LPF 504 can be altered to output the filter's output at any magnification.

The target position of the anti-shake lens generated from the low-frequency components of the hand shaking angle signal generated above is input to the first lens position control unit 205 after the drive amount is limited in a first drive limit 505. The target position of the anti-shake lens generated from the high-frequency components of the hand shaking angle signal is input to the third lens position control unit 211 after the drive amount is limited by a third drive limit 506.

The position information of the first anti-shake lens 103 detected by the first hall element 209 is compared to the lens target position output from the first drive limit 505 after the amplification to the predetermined amplitude by a first position detecting signal amplifier 507. And then, the anti-shake operation is carried out by the position feedback control through the first driving unit 207.

Also, the position information of the second anti-shake lens 113 detected by the third hall element 216 is compared to the lens target position output from the third drive limit 506 after the amplification to the predetermined amplitude by a third position detecting signal amplifier 508. And then, the anti-shake operation is carried out by the position feedback control through the third driving unit 214. For the first lens position control unit 205 and the third lens position control unit 211, any control calculators may be used. In the example, a PID controller is used as the first lens position control unit 205 and the third lens position control unit 211.

Figure 6:
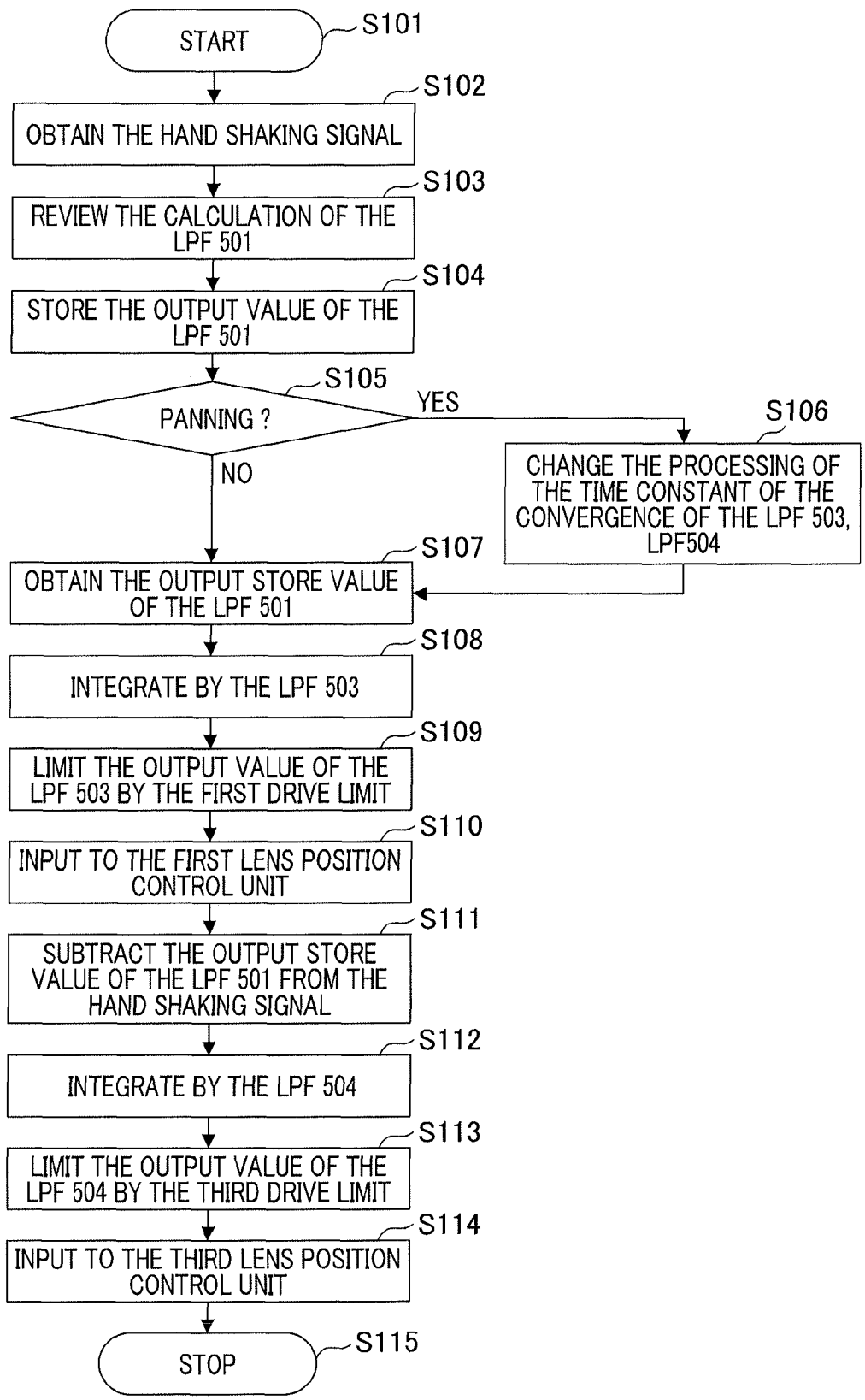
FIG. 6 is a flowchart illustrating a target position calculation-processing of an anti-shake lens.

FIG. 6 is a flowchart illustrating a target position calculation-processing of an anti-shake lens in accordance with the image pickup apparatus of the embodiment. An anti-shake control calculation is carried out at a regular cycle interval. Firstly, when the processing is started (step S101), the vibration sensor 201 obtains the hand shaking signal (step S102). Then, the calculation for dividing the frequency band of the hand shaking signal is performed (step S103) to store the result of the calculation of the LPF 501 as the low-frequency components of the hand shaking signal to the memory (step S104).

Next, the panning determination unit 502 determines whether the image pickup apparatus is at the panning operation (panning) or not (step S105). If the image pickup apparatus is determined to be panning, it allows the time constant until the LPF 503 and 504 become stable to be short (step S106). If the image pickup apparatus is not determined to be panning, the processing for altering the time constant is not performed, and the processing goes to a step S107.

In the step S107, the LPF 503 obtains the output value of the LPF 501 stored to the memory in the step s104. And then, the LPF 503 integrates the obtained output value to transform it from the angle velocity information to the angle information (step S108). Then, the first drive limit 505 limits the output value of the LPF 503 to the predetermined amplitude (step S109). And the first drive limit 505 inputs the output value of the LPF 503 to the first lens position control unit 205 (step S110). Thereby, the first anti-shake lens 103 is driven.

Next, the subtracter 500 substracts the output value of the LPF 501 stored in the step S104 from the hand shaking signal obtained in the step S102 to extract the high-frequency components of the hand shaking signal. Thereby, the hand shaking signal is divided into the low-frequency components and the high-frequency components at the cutoff frequency set by the LPF 501.

The LPF 504 integrates the high-frequency components of the extracted hand shaking signal to transform it from the angle velocity signal to the angle signal (step S112). Then, the third drive limit 506 limits the output value of the LFP 504 to a predetermined amplitude (step S113) to input it to the third lens position control unit 211 (step S114). Thereby, the second anti-shake lens 113 is driven.

According to an embodiment of the present invention, the image shake correcting device divides the hand shaking signal into low-frequency components and high-frequency components to correct each component by the first lens position control unit 205 and the third lens position control unit 211 respectively. Thereby, the reduction in the performance of the image shake correction due to the difference depending on the characteristics of the photographer's hand shaking or the photographing status can be prevented.

Next, according to the present embodiment, a description will be given of the drive condition of the first correcting unit and the second correcting unit in the image shake correcting device referring to FIG. 7. In this example, the first anti-shake lens 103 functions as the first correcting unit. Also, the second anti-shake lens 113 functions as the second correcting unit.

(Anti-Shake Frequency Band)
The anti-shake frequency band of the first correcting unit is the low-frequency components of the hand shaking signal. The anti-shake frequency band of the second correcting unit is the high-frequency components of the shake signal.

(Correction Angle of the Anti-Shake)
The correction angle of the anti-shake by the first correcting unit is set more widely compared to the correction angle of the anti-shake by the second correcting unit because the low-frequency components of the shake signal is typically larger than the high-frequency components of that and needs many anti-shake angles. Thereby, the setting allows the mechanical configuration corresponding to the second correcting unit to be smaller compared to that of the first correcting unit.

(Deterioration in Optical Performance by the Lens Driving)
Generally, when the drive amount of the correcting unit for the shake signal becomes larger, a peripheral light amount, resolution, and aberration tend to deteriorate. Thereby, the first correcting unit is set to the configuration so as not to cause deterioration of the optical performance due to the lens driving compared to the second correcting unit because the drive amount for the anti-shake is likely to be large in the first correcting unit.

(Drive Mode)
In the drive mode of the anti-shake lens, the deterioration in optical performance of the tilt mode to the well-known optical axis is less than that of the shift mode in the plane perpendicular to the optical axis. Accordingly, in the first correcting unit, the first anti-shake lens 103 is considered to the drive mode in the tilting direction, and the second anti-shake lens 113 is considered to the shift drive mode.

(Arrangement Position of the Lens)
In the example, the correction angle of the first correcting unit is set to be larger than that of the second correcting unit. Accordingly, the first anti-shake lens 103 is arranged closer to the object image side than that of the second anti-shake lens 113. Additionally, the deterioration in optical performance of the first anti-shake lens 103 is less than that of the second anti-shake lens 113.

(Amplification Factor of the Position Detection Signal)
A signal output by the Hall element is a position detection signal of the anti-shake lens. In the amplification factor of the position detection signal amplifier for amplifying the Hall element signal to the predetermined magnification, the larger amplification factor of the Hall element improves the resolution for detecting the position. However, if the electric signal after the amplification is obtained digitally by an AD converter or the like, a dynamic range is often not expanded within a limited voltage range. Accordingly, the amplification factor of the Hall element signal corresponding to the first correcting unit configured to correct the low-frequency shake that requires the dynamic range is set to be small because the dynamic range is balanced with the resolution. On the other hand, the amplification factor of the Hall element signal corresponding to the second correcting unit that causes many small shakes at the high-frequency is set to be large to allow the resolution of the position detection to be higher. More specifically, the signal amplification factor by the first position detecting signal amplifier 507 that is a first signal amplifying unit is reduced instead of the signal amplification factor by the third position detecting signal amplifier 508 that is a second signal amplifying unit.

(Anti-Shake Adjustment Frequency)
The anti-shake adjustment frequency is a frequency that has the most effective anti-shake effect by the correcting unit. In the example, the anti-shake adjustment frequency of the first correcting unit is set to be less than that of the second correcting unit.

FIG. 8 illustrates an anti-shake performance of the conventional image shake correcting device with one anti-shake lens and an anti-shake performance of an image shake correcting device with two anti-shake lenses according to an embodiment of the present invention.

Figure 8A:
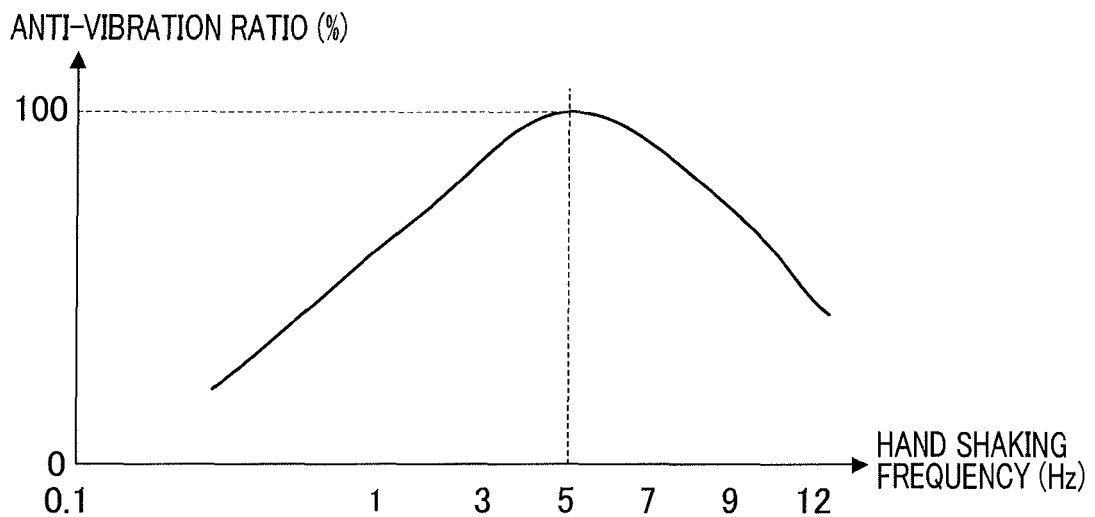
FIGS. 8A and 8B illustrate anti-shake performance of a conventional image shake correcting device and anti-shake performance of an image shake correcting device according to an embodiment of the present invention.
Figure 8B:
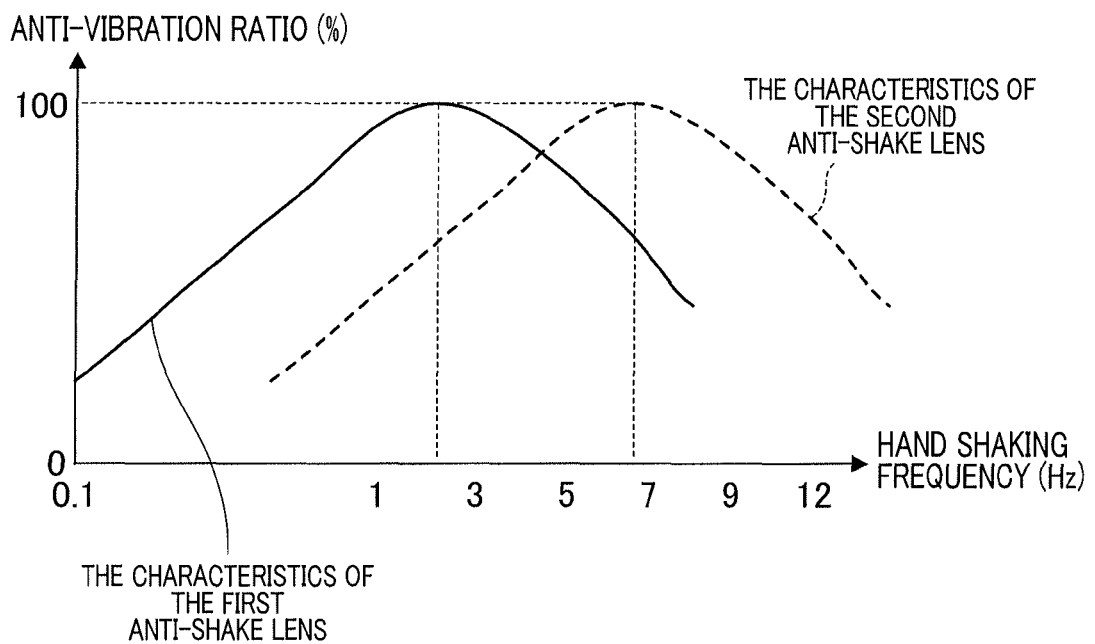

FIG. 8A illustrates the anti-shake performance of the conventional image shake correcting device. FIG. 8B illustrates the anti-shake performance of the image shake correcting device according to an embodiment of the present invention. The vertical axes of FIG. 8A and FIG. 8B show the anti-vibration ratio. The abscissa axes of those show the hand shaking frequency. The anti-vibration ratio is an index of the hand shaking performance. The anti-vibration ratio is expressed by the following formula:

Anti-vibration ratio=(the shake amount when the hand shaking correction turns "off"−the shake amount when the hand shaking correction turns "on")/the shake amount when the hand shaking turns "off"×100%  [Formula 1]

In the above formula, if the remaining swing when the hand shaking is lost (becomes 0), the anti-vibration ratio becomes 100%.

As shown in FIG. 8A, in the conventional image shake correcting device, the anti-vibration ratio is largest at one hand shaking frequency because it is difficult to maximize the anti-vibration ratio at all of the hand shaking frequencies due to the factors such as the precision, characteristics, and variations in reference to sensitivity of the shake sensor, or the drive characteristics of the anti-shake lens, the tuning the anti-shake controller, and the lens position controller. Therefore, for example, according to the conventional image shake correcting device, if the tuning of the controller and a gain of an integral LPF in the anti-shake controller is adjusted to maximize the anti-vibration ratio of the low-frequency side, the anti-vibration ratio of the high-frequency is reduced.

On the other hand, the image shake correcting device according to an embodiment of the present invention divides the shake signal into a low-frequency and a high-frequency to correct each frequency by the separate anti-shake lenses respectively. Therefore, as shown in FIG. 8B, according to an embodiment of the present invention, the anti-vibration ratios of the low-frequency and the high frequency are tuned so as to be maximized respectively to expand the frequency band and improve the anti-shake performance compared to the conventional image shake correcting device. In turn, according to an embodiment of the present invention, the image shake correcting device can absorb the difference of the anti-shake performance depending on the difference tendency for the hand shaking frequency by the users and improve the effect of the hand shaking correction.

(Frequency Band of the Return Control Unit)

Referring back to FIG. 7, the second correcting unit mainly performs the anti-shake on the high frequency side. Therefore, the frequency band of the first feedback control unit for the feedback control at the current position of the second correcting unit is set to be higher than that of the second feedback control unit for the feedback control at the current position of the second correcting unit. The first lens position control unit 205 is corresponding to the first feedback control unit. Also, the third lens position control unit 211 is corresponding to the second feedback control unit.

(Anti-Shake Angle to the Lens Drive Stroke)

The anti-shake angle obtained at the same stroke is different depending on the type of the anti-shake lens because of its optical characteristics. In the first correcting unit, the anti-shake angle of the lens obtained at the drive stroke is larger than that of the second correcting unit. The Lens is used as the first correcting unit for the main anti-shake of the low-frequency that requires the larger anti-shake angle.

According to an embodiment of the present invention, the image shake correcting device designs the first correcting unit and the second correcting unit corresponding to the amplitude of the shake frequencies respectively. Thereby, the processing of the image shake correction can be performed without an increase in the size of the apparatus while insusceptible to the shake correction performance by the difference of the photographing condition, the shake amount by the photographer and the like, and the shake frequency to obtain the high anti-shake effect.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-212893, filed Oct. 10, 2013, which is hereby incorporated by reference herein in its entirety.

What is claimed is:

1. An optical apparatus comprising:
   a shake detecting unit configured to detect a shake of the optical apparatus; and
   a first optical correcting unit and a second optical correcting unit configured to correct optically an image shake by using a shake signal output from the shake detecting unit,
   wherein the first optical correcting unit is used to correct optically the image shake based on frequency components lower than predetermined frequency components extracted from the shake signal, and
   wherein the second optical correcting unit is used to correct optically the image shake based on frequency components higher than the predetermined frequency components extracted from the shake signal, and
   wherein an image shake correction angle of the first optical correcting unit is wider than that of the second optical correction unit.

2. An optical apparatus comprising:
   a shake detecting unit configured to detect a shake of the optical apparatus; and
   a first optical correcting unit and a second optical correcting unit configured to correct optically an image shake by using a shake signal output from the shake detecting unit,
   wherein the first optical correcting unit is used to correct optically the image shake based on frequency components lower than predetermined frequency components extracted from the shake signal,
   wherein the second optical correcting unit is used to correct optically the image shake based on frequency components higher than the predetermined frequency components extracted from the shake signal, and
   wherein the first optical correcting unit is an optical element having a deterioration in optical performance that is less than that of the second optical correcting unit.

3. An optical apparatus comprising:
   a shake detecting unit configured to detect a shake of the optical apparatus; and
   a first optical correcting unit and a second optical correcting unit configured to correct optically an image shake by using a shake signal output from the shake detecting unit,
   wherein the first optical correcting unit is used to correct optically the image shake based on frequency components lower than predetermined frequency components extracted from the shake signal, wherein the second optical correcting unit is used to correct optically the image shake based on frequency components higher than the predetermined frequency components extracted from the shake signal, and wherein the first optical correcting unit is arranged closer to an object in an optical axis direction relative to the second optical correcting unit.

4. An optical apparatus comprising:

a shake detecting unit configured to detect a shake of the optical apparatus; and a first optical correcting unit and a second optical correcting unit configured to correct optically an image shake by using a shake signal output from the shake detecting unit, wherein the first optical correcting unit is used to correct optically the image shake based on frequency components lower than predetermined frequency components extracted from the shake signal, wherein the second optical correcting unit is used to correct optically the image shake based on frequency components higher than the predetermined frequency components extracted from the shake signal, and wherein a resolution of the first optical correcting unit is smaller than that of the second optical correcting unit.

5. An optical apparatus comprising:

a shake detecting unit configured to detect a shake of the optical apparatus; and a first optical correcting unit and a second optical correcting unit configured to correct optically an image shake by using a shake signal output from the shake detecting unit, wherein the first optical correcting unit is used to correct optically the image shake based on frequency components lower than predetermined frequency components extracted from the shake signal, wherein the second optical correcting unit is used to correct optically the image shake based on frequency components higher than the predetermined frequency components extracted from the shake signal, and wherein an anti-shake adjustment frequency of the first optical correcting unit is lower than that of the second optical correcting unit.

6. A control method for an optical apparatus comprising:

detecting a shake of the optical apparatus; and correcting, in a first optical correcting step and a second optical correcting step, optically an image shake by using a shake signal output from the detecting, wherein, in the first optical correcting step, the image shake is corrected optically based on frequency components lower than predetermined frequency components extracted from the shake signal, wherein, in the second optical correcting step, the image shake is corrected optically based on frequency components higher than the predetermined frequency components extracted from the shake signal, and wherein an image shake correction angle in the first optical correcting step is wider than that of in the second optical correcting step.

7. A control method for an optical apparatus comprising:

detecting a shake of the optical apparatus; and correcting, in a first optical correcting step and a second optical correcting step, optically an image shake by using a shake signal output from the detecting, wherein, in the first optical correcting step, the image shake is corrected optically based on frequency components lower than predetermined frequency components extracted from the shake signal, wherein, in the second optical correcting step, the image shake is corrected optically based on frequency components higher than the predetermined frequency components extracted from the shake signal, and wherein a first optical correcting unit used in the first optical correcting step is an optical element having a deterioration in optical performance that is less than that of a second optical correcting unit used in the second optical correcting step.

8. A control method for an optical apparatus comprising:

detecting a shake of the optical apparatus; and correcting, in a first optical correcting step and a second optical correcting step, optically an image shake by using a shake signal output from the detecting, wherein, in the first optical correcting step, the image shake is corrected optically based on frequency components lower than predetermined frequency components extracted from the shake signal, wherein, in the second optical correcting step, the image shake is corrected optically based on frequency components higher than the predetermined frequency components extracted from the shake signal, and wherein a first optical correcting unit used in the first optical correcting step is arranged closer to an object in an optical axis direction relative to a second optical correcting unit used in the second optical correcting step.

9. A control method for an optical apparatus comprising:

detecting a shake of the optical apparatus; and correcting, in a first optical correcting step and a second optical correcting step, optically an image shake by using a shake signal output from the detecting, wherein, in the first optical correcting step, the image shake is corrected optically based on frequency components lower than predetermined frequency components extracted from the shake signal, wherein, in the second optical correcting step, the image shake is corrected optically based on frequency components higher than the predetermined frequency components extracted from the shake signal, and wherein a resolution in the first optical correcting step is smaller than that in the second optical correcting step.

10. A control method for an optical apparatus comprising:

detecting a shake of the optical apparatus; and correcting, in a first optical correcting step and a second optical correcting step, optically an image shake by using a shake signal output from the detecting, wherein, in the first optical correcting step, the image shake is corrected optically based on frequency components lower than predetermined frequency components extracted from the shake signal, wherein, in the second optical correcting step, the image shake is corrected optically based on frequency components higher than the predetermined frequency components extracted from the shake signal, and wherein an anti-shake adjustment frequency in the first optical correcting step is lower than that in the second optical correcting step.

* * * * *